United States Patent [19]
Coudurier

[11] Patent Number: 5,463,916
[45] Date of Patent: Nov. 7, 1995

[54] PROCESS FOR THE PREPARATION OF A SURFACE FOR THE SECUREMENT OF A COATING

[75] Inventor: Alain Coudurier, Albens, France

[73] Assignee: SEB S.A., Selongey, France

[21] Appl. No.: 31,297

[22] Filed: Mar. 12, 1993

[30]   Foreign Application Priority Data

Mar. 13, 1992 [FR] France ................... 92 03029

[51] Int. Cl.$^6$ ................... B21K 5/20
[52] U.S. Cl. ................... 76/107.1; 29/527.4
[58] Field of Search ............ 76/107.1; 29/424, 29/527.2, 524.4; 101/32; 204/129.65; 156/659.1

[56]           References Cited

U.S. PATENT DOCUMENTS 3,008,601  11/1961  Cahne .
3,043,321   7/1962  McDermott ................... 76/107.1 X

FOREIGN PATENT DOCUMENTS

| 0259056 | 3/1988 | European Pat. Off. . |
| 0389966 | 10/1990 | European Pat. Off. . |
| 2026575 | 9/1970 | France . |
| 3120351 | 12/1982 | Germany . |
| 61-186111 | 8/1986 | Japan . |
| 2-099208 | 4/1990 | Japan . |

*Primary Examiner*—Douglas D. Watts
*Attorney, Agent, or Firm*—Young & Thompson

[57]           ABSTRACT

A process for the preparation of a metallic surface permits securing a coating to this latter. The process comprises etching on a matrix (11) of hard metal a series of relief designs (12) separated by empty spaces (13). The etching has the effect of creating microcavities (15) in the metal adjacent to the empty spaces (13). The matrix (11) is applied by pressing to a disc of metal softer than that of the matrix (11) to impress the relief designs (12) and the microcavities of the matrix on the disc. The process is particularly useful for the production of a stamped cooking utensil.

12 Claims, 2 Drawing Sheets

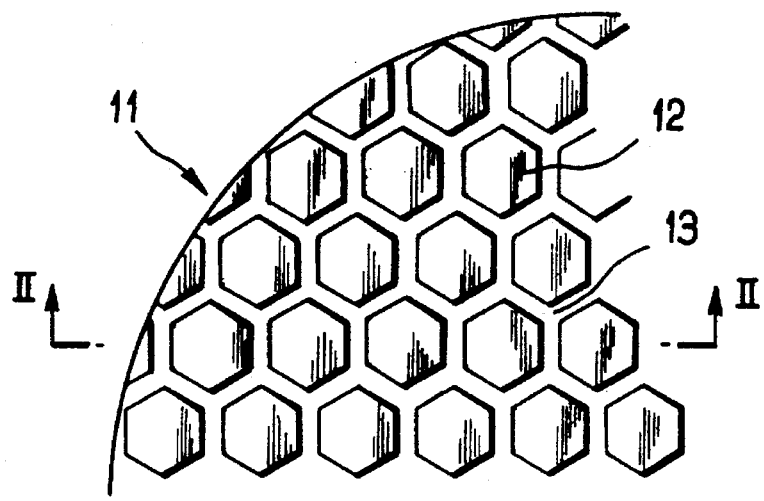
FIG_1
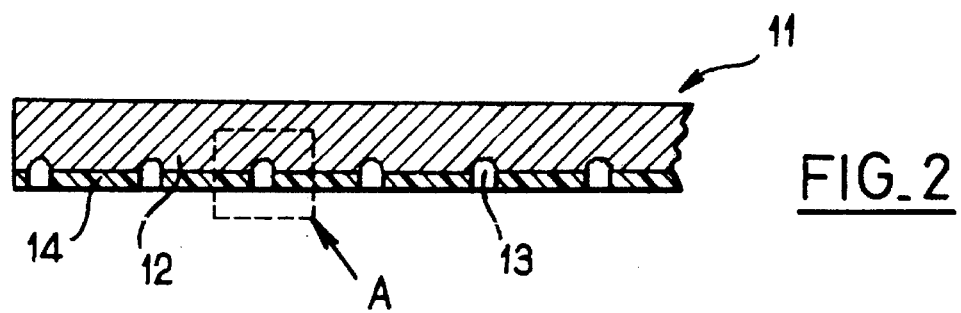
FIG_2
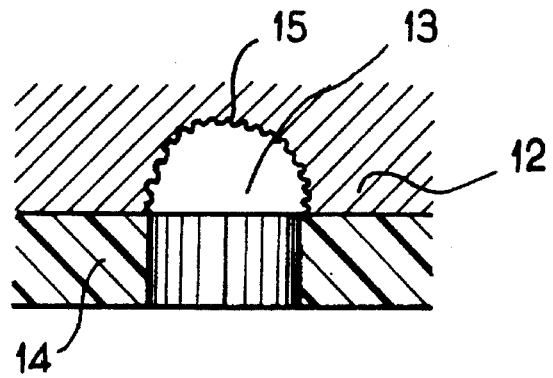
FIG_3
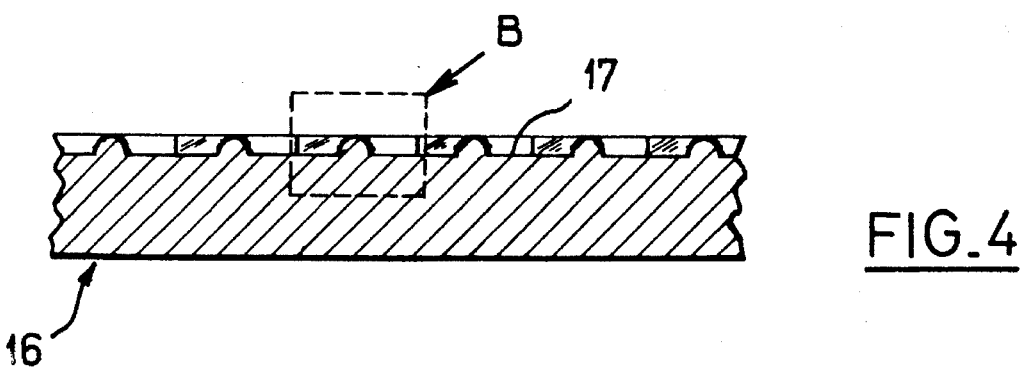
FIG_4

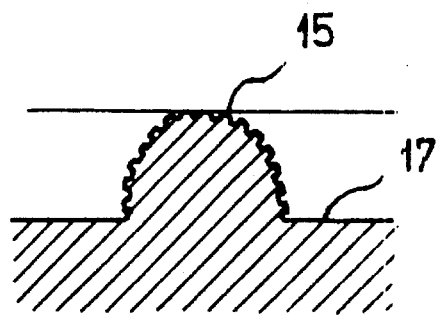
FIG_5
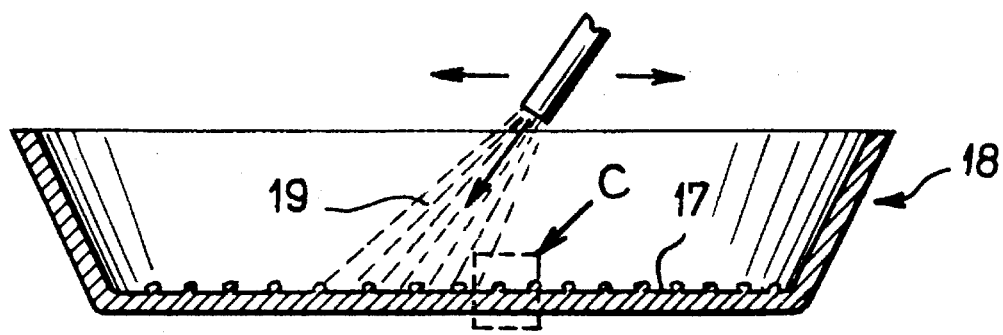
FIG_6
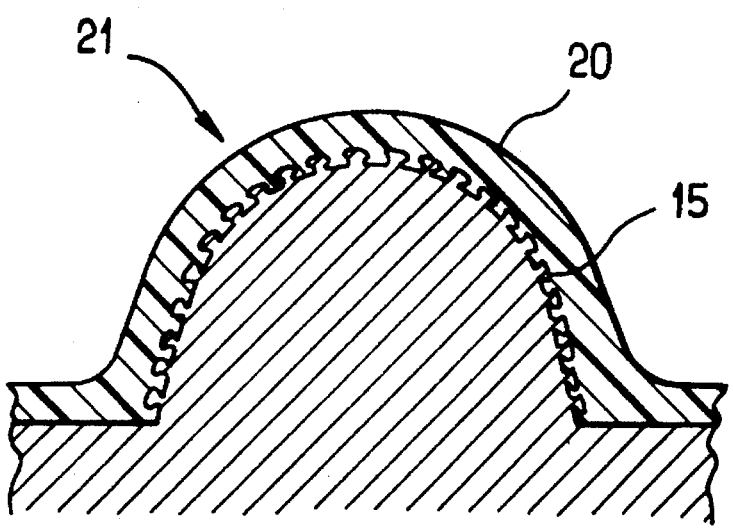
FIG_7

PROCESS FOR THE PREPARATION OF A SURFACE FOR THE SECUREMENT OF A COATING

FIELD OF THE INVENTION

The present invention relates to a process for the preparation of a metallic surface to permit securing a coating on this latter.

The invention particularly aims to improve the securement of a coating of polytetrafluoroethylene to the surface of a stamped cooking receptacle.

BACKGROUND OF THE INVENTION

The known procedure to permit securement of polytetrafluoroethylene (PTFE) to an aluminum plate adapted to be stamped to the form of a cooking receptacle, consists in subjecting this plate to acid attack. This latter permits providing on the surface of the aluminum plate a multitude of microcavities ensuring excellent securement of the PTFE coating.

There is also known a procedure consisting in applying first on the plate preliminarily sandblasted, a primary securement layer to which is applied one or several PTFE layers adhering completely and directly to the primary layer.

SUMMARY OF THE INVENTION

The object of the present invention is to provide a process for the preparation of a metallic surface permitting improving the securement of a coating such as a PTFE coating.

According to the invention, this process is characterized by the following steps:

a) there is etched on a hard metal matrix a series of projecting patterns separated by empty spaces, this etching having the effect of creating microcavities in the metal adjacent to said empty spaces.

b) the matrix is applied under pressure to a metal disc on plate softer than the matrix to impress the relief patterns and the microcavities of this latter on the surface of said plate.

The relief patterns and the microcavities impressed on the plate permit obtaining an excellent securement of a coating, particularly of PTFE.

This process has the particular advantage of avoiding acid attack of the plate or the application of a primary layer.

Moreover, the imprinting of the patterns, effected by pressing on the surface of the plate, permits improving the wear resistance of this surface. This property is important particularly in the case of an aluminum plate which is a relatively soft metal and thus subject to scratching.

The matrix is preferably of steel. Such a matrix, thanks to its hardness, can be used to impress a very large number of aluminum plates.

Preferably, after step b), the surface of the plate comprising the impressed empty designs, is subjected to sandblasting.

This sandblasting has the effect of partially closing the microcavities impressed in the plate, which improves their ability to secure the coating of PTFE or the like.

According to a preferred embodiment of the invention, after sandblasting, the surface is cleaned by means of an alkaline wash.

This alkaline wash eliminates the sand grains remaining after the preceding step and further hollows out the microcavities.

When the process according to the invention is used for the production of a cooking utensil, the plate is stamped in the shape of a receptacle after the preceding step, which is to say before the operation of sandblasting and before cleaning with the alkaline wash.

Other features and advantages of the invention will become apparent from the following description.

BRIEF DESCRIPTION OF THE DRAWINGS

In the accompanying drawings, given by way of non-limiting examples:

FIG. 1 is a fragmentary plan view of a matrix bearing a mask, after chemical attack;

FIG. 2 is a cross-sectional view on the line II—II of FIG. 1;

FIG. 3 is a view on an enlarged scale of detail A of FIG. 2;

FIG. 4 is a cross-sectional view of a metal disc after application by pressure of the matrix;

FIG. 5 is a view on an enlarged scale of detail B of FIG. 4;

FIG. 6 is a cross-sectional view of the stamped plate in the form of a cooking receptacle, subjected to sandblasting;

FIG. 7 is a view on an enlarged scale of detail C of FIG. 6, after application of a polytetrafluoroethylene coating.

DETAILED DESCRIPTION OF THE INVENTION

There will now be described the process according to the invention used for the production of a cooking utensil.

There is applied to a matrix 11 of steel, shown in FIG. 1, a mask 14 reproducing the contours of the relief designs 12. The mask 14 leaves free the portions of the metal corresponding to the empty spaces 13 which will be etched by chemical attack. The mask 14 is obtained for example by a conventional photogravure process.

The matrix 11 covered by the mask 14 is subjected to chemical attack, by means of nitric acid for example, having the result of hollowing into the metal the free spaces and forming empty spaces 13, shown in FIG. 2, and microcavities 15 shown in FIG. 3. The designs 12 of the matrix 11 are of hexagonal shape and preferably have a dimension comprised between 1 and 3 mm and a height of about 0.5 to 2 mm. The spaces 13 comprised between the designs 12 have a width of about 0.5 to 2 mm.

After removal of the mask 14, the matrix 11 is pressed against a metal plate 16, of a softer metal than that of the matrix 11, and more particularly of aluminum. The pressing process ordinarily uses a weight of the order of 1,000 tons.

On the surface 17 of the plate 16 are thus imprinted as hollows the relief designs 12, shown in FIG. 4, and the microcavities 15, shown in FIG. 5.

The plate 16, obtained according to the process of the invention, is then stamped into the shape of a cooking receptacle 18, shown in FIG. 6.

The interior surface 7 of the receptacle 18 is subjected to sandblasting 19 which has the effect of partially closing the microcavities 15 impressed on the surface 17.

The sandblasting 19 improves the process according to the invention, particularly the ability of the surface 17 to secure the PTFE coating 20.

The surface 17 of the receptacle 18 is then cleaned by means of an alkaline wash having the effect of removing the sand remaining in the microcavities 15 and enlarging these latter.

The PTFE coating 20 is then projected on the surface 17 of the receptacle 18. The securement of the PTFE coating 20 shown in FIG. 7 is improved by the process according to the invention, particularly at the microcavities 15 impressed in the surface 17 of the receptacle 18.

The matrix 11 used in the process according to the invention has the advantage, by choice of hexagonal shape of the relief designs, of offering a large contact surface during pressing of the plate 16.

The risk of sliding during contact of the matrix 11 and the surface 18 is thus minimized and does not impede the formation of the microcavities 15 on the surface 17 of the plate 16.

Moreover, the plate 16 is considerably hardened during the pressing process over substantially all of the surface 17.

The reliefs 21 of the surface 17 permit improving the wear resistance of the PTFE coating 20, particularly during use of a cutting member on the surface 17, by limiting the points of wear to the reliefs 21.

Finally, the reliefs 21 on the plate 16 also permit reducing the contact surface of the food with the surface 17 of the cooking receptacle 18 during its use and thus improve the non-stick quality of the PTFE coating 20.

Of course, the invention is not limited to the embodiment which has been described, and numerous modifications could be brought to the latter without departing from the scope of the invention.

The matrix 11 could also be produced with relief designs 12 of different shapes.

There could also be first formed on the matrix 11 a series of repeating relief designs 12, then there could be applied on this matrix 11 a mask 14 covering the relief designs 12 and leaving free the empty spaces 13 between these designs. The assembly is then subjected to chemical attack which has the effect of hollowing out the metal adjacent the free spaces 13 of the microcavities 15.

The matrix could also be etched by electro-erosion. There is used a metallic electrode which has a surface comprising designs and hollows which are the reverse of the imprint which one desires to form on the matrix. This electrode is disposed facing the matrix and is under high voltage. Electric micro-arcs form between the electrode and the matrix, creating in known manner in the matrix hollows separating the relief designs, and microcavities. This process permits, by varying the voltage applied to the electrode, to adjust the dimensions of the microcavities.

I claim:

1. Process for the preparation of a metallic surface (17) to permit securing a coating (20) on the metallic surface, which comprises:

a) etching on a hard metal matrix (11) a series of relief designs (12) having a flat top separated by empty spaces (13) having a rounded shape, said etching having the effect of creating microcavities (15) in the metal adjacent said empty spaces (13);

b) applying said matrix (11) under pressure on a plate (16) of softer metal than the matrix (11) to impress the relief designs (12) and the microcavities (15) on the surface (17) of said plate (16); and c) applying a coating on the surface of said plate.

2. Process according to claim 1, wherein the etching of the matrix (11) is effected by chemical attack.

3. Process according to claim 1, wherein the etching of the matrix (11) is effected by electroerosion.

4. Process according to claim 2 wherein said relief designs (12) are formed by applying to the matrix (11) a mask (14) reproducing the contours of the designs to be etched, said mask (14) leaving free portions of the metal corresponding to said empty spaces (13) to be etched.

5. Process according to claim 1, wherein the matrix (11) is of steel.

6. Process according to claim 1, wherein the plate (16) is of aluminum.

7. Process according to claim 1 wherein after step b), the surface (17) of the plate (16) having the designs (12) impressed as hollows, is subjected to sandblasting (19).

8. Process according to claim 7, wherein after the sandblasting (19), the surface (17) is cleaned with an alkaline wash.

9. Process according to claim 1, wherein the coating applied to the surface is a coating of polytetrafluoroethylene (20).

10. Process according to claim 1, wherein the relief designs (12) of the matrix (11) have a size between 1 and 3 mm, the empty spaces (13) comprised between the designs having a width comprised between about 0.5 and 2 mm.

11. Process according to claim 10, wherein the height of the relief designs (12) is comprised between about 0.5 and 2 mm.

12. Process according to claim 1 used for the production of a cooking utensil, wherein the plate is stamped to the shape of a receptacle (18) after step b).

\* \* \* \* \*